United States Patent
Lucas et al.

(10) Patent No.: US 8,701,951 B2
(45) Date of Patent: Apr. 22, 2014

(54) REMOVABLE CARRY BAG INTEGRATED INTO DOOR TRIM

(75) Inventors: Marc Jonathon Lucas, Novi, MI (US); Kathleen Pecoraro, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 660 days.

(21) Appl. No.: 12/871,294

(22) Filed: Aug. 30, 2010

(65) Prior Publication Data
US 2011/0139846 A1   Jun. 16, 2011

(51) Int. Cl.
| | |
|---|---|
| *A45F 4/00* | (2006.01) |
| *A45C 15/00* | (2006.01) |
| *B62J 7/00* | (2006.01) |
| *B62J 9/00* | (2006.01) |
| *B62J 11/00* | (2006.01) |
| *H02J 7/00* | (2006.01) |

(52) U.S. Cl.
USPC ........... 224/539; 224/575; 224/576; 224/416; 224/417; 224/418; 224/432; 224/444; 320/109

(58) Field of Classification Search
USPC .......... 320/109; 224/539, 575, 576, 416–418, 224/432, 444
See application file for complete search history.

(56) References Cited

U.S. PATENT DOCUMENTS

| | | | |
|---|---|---|---|
| 5,653,337 A * | 8/1997 | Cirigliano ..................... 206/373 |
| 6,196,605 B1 * | 3/2001 | Baldas et al. .............. 296/37.13 |
| 6,648,166 B2 * | 11/2003 | Levy .............................. 220/520 |
| 6,832,799 B2 * | 12/2004 | Haspel et al. .............. 296/37.16 |
| 7,270,903 B2 * | 9/2007 | Osborne et al. ............... 429/413 |
| 7,328,825 B2 * | 2/2008 | Kaiser ........................... 224/543 |
| 8,083,113 B2 * | 12/2011 | Klosk ............................. 224/539 |
| 8,141,933 B2 * | 3/2012 | Nakamura .................. 296/146.7 |
| 2003/0000980 A1 * | 1/2003 | Muizelaar et al. ............ 224/404 |
| 2005/0284906 A1 * | 12/2005 | Potts et al. ..................... 224/539 |
| 2006/0061333 A1 | 3/2006 | Kranz |
| 2007/0241154 A1 * | 10/2007 | Potts et al. .................... 224/539 |
| 2011/0169447 A1 * | 7/2011 | Brown et al. ................. 320/109 |

FOREIGN PATENT DOCUMENTS

| | | |
|---|---|---|
| EP | 2157637 A1 | 2/2010 |
| JP | 07143610 A | 6/1995 |
| JP | 2009136108 A | 6/2009 |
| WO | 7900630 A1 | 9/1979 |
| WO | 2009035531 A2 | 3/2009 |

* cited by examiner

*Primary Examiner* — Brian D Nash
*Assistant Examiner* — Derek Battisti
(74) *Attorney, Agent, or Firm* — David B. Kelley; Brooks Kushman P.C.

(57) ABSTRACT

A vehicle includes a high voltage traction battery, a front door trim including a removable trim panel, a removable/portable bag integral to the removable trim panel for storing inside the front door trim when the removable trim panel is attached to the front door trim. A charge cord kit is contained in the removable/portable bag, and includes a charge cord for connecting to an electrical power supply to charge the high voltage traction battery.

16 Claims, 2 Drawing Sheets

REMOVABLE CARRY BAG INTEGRATED INTO DOOR TRIM

BACKGROUND

1. Technical Field

The invention relates to a charge cord kit for plug-in hybrid and battery electric vehicles.

2. Background Art

In a battery electric vehicle or plug-in hybrid electric vehicle, the vehicle may be plugged-in to an electrical supply to charge the high voltage traction battery. The vehicle includes a charger to convert household or industrial power supply alternating current (AC) to high voltage (HV) direct current (DC) to charge the high voltage battery.

Package of a charge cord kit for plug in and battery electric vehicles is problematic since the kit needs to be readily accessible by the driver every time the vehicle needs charging (which could be once or twice a day). It is inconvenient to the customer to have the kit stored in the trunk of the vehicle as this necessitates the driver having to access the trunk or lift gate of the vehicle to access the kit.

Furthermore, most charge port locations are at the front or sides of the vehicle, and if parked in a garage it may not be possible to open the lift gate/trunk.

For the foregoing reasons, there is a need for an easily reached package location for the charge cord kit near the driver and inside the cabin. A solution also should ensure the kit can easily be stored and not specifically wrapped or inserted in a unique way that makes storage of the kit difficult.

Background information may be found in JP 2009136108 A, WO 79/00630 A1, US 2006/0061333 A1, JP 07-143610 A, EP 2157637 A1, WO 2009/035531 A2.

SUMMARY

It is an object of the invention to provide a removable carry bag integrated into door trim that allows removal and storage of a charge cord kit for plug in and battery electric vehicles.

In one embodiment, a vehicle comprises a high voltage traction battery, a front door trim including a removable trim panel, and a removable/portable bag integral to the removable trim panel for storing inside the front door trim when the removable trim panel is attached to the front door trim. The vehicle further comprises a charge cord kit contained in the removable/portable bag, and including a charge cord for connecting to an electrical power supply to charge the high voltage traction battery.

At the more detailed level, embodiments of the invention comprehend additional features that may be included individually or in various combinations as appropriate for a particular application. For example, the charge cord kit may further comprise a ground fault circuit interrupter (GFCI) affixed to the removable/portable bag. The GFCI may be affixed to the inside of the removable/portable bag, such that the bag is folded "inside out" to reveal the GFCI and charge cord. Any suitable approach may be used to affix the removable/portable bag to the removable trim panel. As well, the removable trim panel may include a handle portion for carrying the removable/portable bag when the removable trim panel is removed from the front door trim.

In some embodiments, the removable trim panel includes a locating mechanism that cooperates with an area of the front door trim surrounding the removable trim panel when the removable trim panel is attached to the front door trim. The locating mechanism locates and secures the removable trim panel with respect to the front door trim. The locating mechanism may comprise a slot in the front door trim that receives the removable trim panel.

The front door trim may be a driver-side front door trim. It is appreciated that in other embodiments of the invention, the invention is not limited to a front door trim. Accordingly, the removable trim panel may be included on some other appropriate vehicle trim structure.

In accordance with such an embodiment, a vehicle comprises a high voltage traction battery, and a vehicle trim structure including a removable trim panel. A removable/portable bag is integral to the removable trim panel for storing inside the vehicle trim structure when the removable trim panel is attached to the vehicle trim structure. The vehicle further comprises a charge cord kit contained in the removable/portable bag, including a charge cord for connecting to an electrical power supply to charge the high voltage traction battery.

In another embodiment of the invention, a vehicle comprises a vehicle trim structure including a removable trim panel; and a removable/portable bag integral to the removable trim panel for storing inside the vehicle trim structure when the removable trim panel is attached to the vehicle trim structure.

There are many advantages associated with embodiments of the invention. For example, embodiments of the invention allow the charge cord kit to be stored inside the vehicle in an easy to access location that is aesthetically pleasing to the customer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Plug in hybrid and/or battery electric vehicles utilize a charge cord to connect the household electrical outlet to the vehicle. In one embodiment, the invention proposes to use a removable bag integrated into the front door trim panel to contain and transport a charge cord kit for plug in hybrid and battery electric applications. One implementation of this concept is to use a bag glued or affixed to the GFCI. When charging is complete the bag is folded "inside out" and the charge cord and connector stored inside. The bag has a molded trim panel on the outside which also might act as a carry handle. The bag is then placed in the door trim storage bin and the trim panel lowered into guides and pushed into place. This allows the charge cord kit to be stored inside the vehicle in an easy to access location and is aesthetically pleasing to the customer.

When compared to other possible solutions, embodiments of the invention have advantages. In more detail, when charging is complete the customer has to store the charge cord kit, often this will be in the vehicle. Storage bins in the trunk are the easiest option but require the customer to open and close the trunk each time they charge the vehicle. The charge cord kit is large and will not fit into most storage bins in the door panel as the bin is not deep enough. There are ways to contain the charge cord kit in the storage bin but none offer the ability to contain the kit and remove it when needed. Embodiments of the invention provide a bag to carry the charge cord kit and store it in the vehicle in a location easily accessible by the driver.

At the more detailed level, the invention comprehends various embodiments and may be adapted for various applications. Some embodiments of the invention are specifically directed to plug in hybrids and battery electric vehicles where the vehicle is connected to a household or industrial power supply to charge the high voltage batteries. Embodiments of the invention may also be used on hybrid and traditional powertrain vehicles as a storage device for something other than a charge cord kit.

Figure 1:
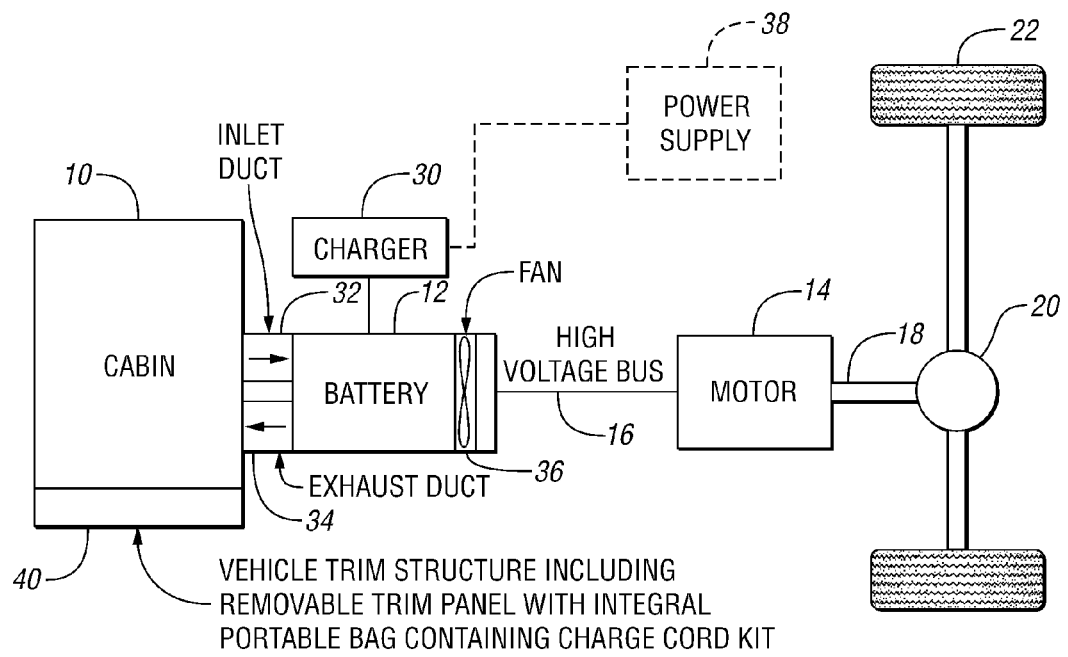
FIG. 1 is a schematic representation of a battery electric vehicle system configuration, including a vehicle trim structure including a removable trim panel with an integral portable bag containing the charge cord kit.

A schematic representation of a battery electric vehicle system configuration is shown in FIG. 1. The vehicle includes cabin 10, high voltage traction battery 12, and electric motor 14. The battery 12 is connected to the electric motor 14 by a high voltage bus 16. In one possible arrangement, an inverter connected to battery 12 converts DC to AC, and electric motor 14 is connected to a high voltage AC bus. Electric motor 14 drives output shaft 18 which is driveably connected through a differential and axle mechanism 20 to wheels 22. The electric motor 14 may be operated in a variety of ways as is appreciated by those skilled in the art. In general, a vehicle system controller (VSC) (not shown) calculates the required motor output, and controls electric motor 14 in an appropriate fashion.

A charger 30 is connected to the battery 12 and converts alternating current (AC) to high voltage direct current (DC) to charge the battery 12 when the charger 30 is plugged into an alternating current (AC) power supply 38, which may be a standard household or industrial power supply.

The vehicle further includes a forced air system including an inlet duct 32 receiving air and providing air to the high voltage traction battery 12, and an outlet duct 34 directing exhaust air from the high voltage traction battery 12. A fan 36 forces the air.

The vehicle further includes a vehicle trim structure 40 including a removable trim panel with an integral portable bag containing the charge cord kit, in accordance with the invention.

Figure 2:
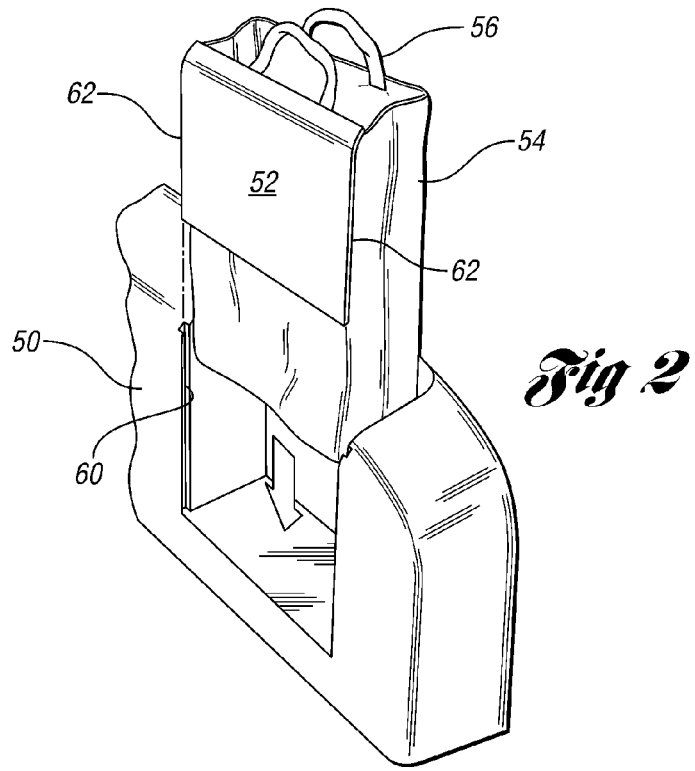
FIG. 2 illustrates an embodiment of the invention in which a front door trim includes a removable trim panel for packaging up the charge cord kit.

As shown in more detail in FIG. 2, a front door trim 50 includes a removable trim panel 52. A removable/portable bag 54 is integral to the removable trim panel 52 for storing inside the front door trim 50 when the removable trim panel 52 is attached to the front door trim 50. The charge cord kit is not specifically shown in FIG. 2, but is contained in the removable/portable bag 54, and includes a charge cord for connecting to an electrical power supply 38 (FIG. 1) to charge the high voltage traction battery 12 (FIG. 1) of the vehicle. As further shown in FIG. 2, the removable/portable bag 54 is affixed to the removable trim panel 52 in any suitable manner. The removable trim panel 52 includes a handle portion 56 for carrying the removable/portable bag 54 when the removable trim panel 52 is removed from the front door trim 50.

Further, the removable trim panel 52 includes a locating mechanism that cooperates with an area of the front door trim 50 surrounding the removable trim panel 52 when the removable trim panel 52 is attached to the front door trim 50. The locating mechanism locates and secures the removable trim panel 52 with respect to the front door trim 50. In the embodiment illustrated, the locating mechanism is composed of a slot 60 in the front door trim 50 that receives the removable trim panel 52 by the edges 62 of the trim panel 52 sliding into opposed slots 60.

Figure 3:
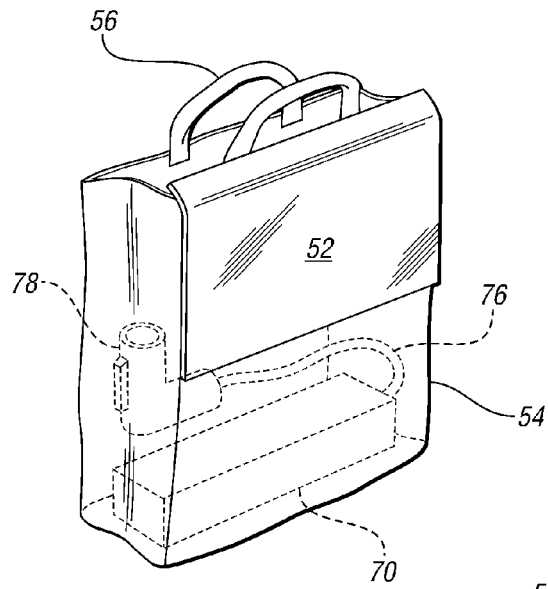
FIG. 3 illustrates the removable/portable bag containing the charge cord kit.
Figure 4:
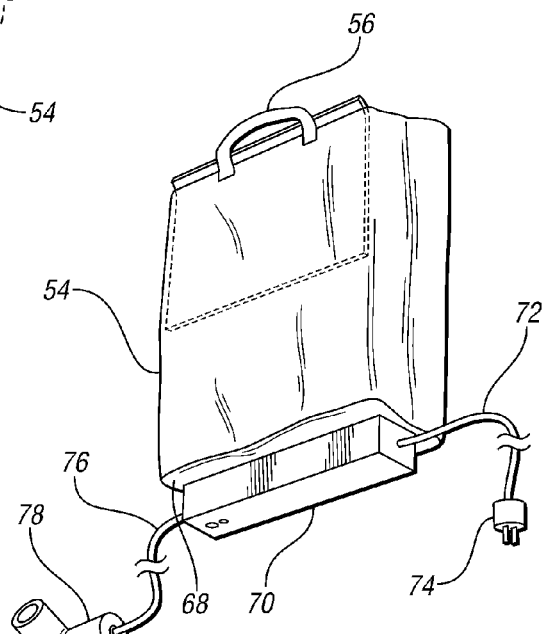
FIG. 4 illustrates the removable/portable bag of FIG. 3, folded "inside out" to expose a GFCI affixed to the bag.

FIGS. 3-4 illustrate the removable/portable bag 54 and integral trim panel 52 in further detail. As shown, the charge cord kit includes ground fault circuit interrupter (GFCI) 70 affixed to the removable/portable bag 54 on the bag bottom surface 68. On one side, the charge cord 72 has a household outlet connector 74. On the other side of the charge cord 76, a vehicle connector 78 is provided. The GFCI 70 is affixed to the inside of the bag 54, with FIG. 4 showing the bag 54 folded "inside out."

Figure 5:
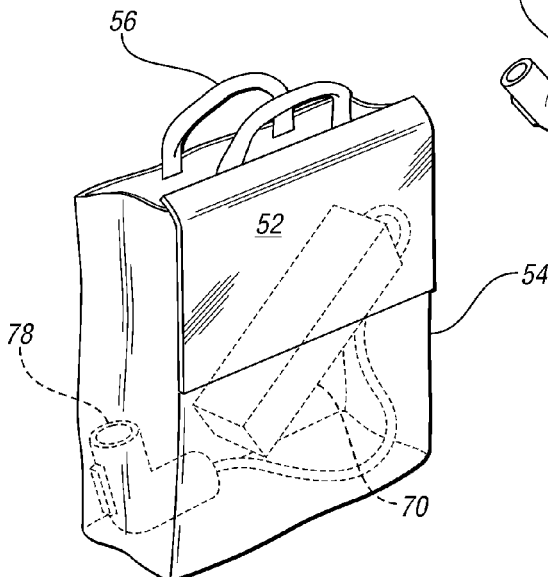
FIG. 5 illustrates a removable/portable bag in another embodiment of the invention.

In FIG. 5, another embodiment of the trim panel 52 and bag 54 is shown. In this implementation, GFCI 70 and the charge cord are not affixed to the bag 54, and are merely storable in the bag 54.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A vehicle comprising:
   a high voltage traction battery;
   a front door trim including a removable trim panel;
   a foldable removable/portable bag integral to the removable trim panel disposable within the front door trim when the removable trim panel is attached to the front door trim; and
   a charge cord kit contained in the removable/portable bag, and including a charge cord for connecting to an electrical power supply to charge the high voltage traction battery,
   wherein the foldable removable/portable bag is capable of being folded inside out such that the charge cord kit is disposed outside of the foldable removable/portable bag and the removable trim panel is disposed inside the foldable removable/portable bag.

2. The vehicle of claim 1 wherein a portion of the charge cord kit is affixed to the removable/portable bag.

3. The vehicle of claim 2 wherein the portion of the charge cord kit affixed to the removable/portable bag is a ground fault circuit interrupter (GFCI).

4. The vehicle of claim 1 further comprising a handle portion connected to the removable/portable bag for carrying the removable/portable bag when the removable trim panel is removed from the front door trim.

5. The vehicle of claim 1 wherein the removable trim panel includes edges that cooperate with a slot defined by the front door trim surrounding the removable trim panel when the removable trim panel is attached to the front door trim such that the removable trim panel is slideably connectable with respect to the front door trim.

6. A vehicle comprising:
a high voltage traction battery;
a cabin having a vehicle trim structure disposed therein including a removable trim panel;
a pliable removable/portable bag connected to the removable trim panel and disposable behind the removable trim panel and hidden from view when the removable trim panel is attached to the vehicle trim structure; and
a charger for the high voltage fraction battery contained in and affixed to the removable/portable bag, and the bag is foldable inside out such that the charger is affixed to the outside of the removable/portable bag and the removable trim panel is at least partially disposed within the pliable removable/portable bag.

7. The vehicle of claim 6 wherein the charger further comprises a ground fault circuit interrupter (GFCI) affixed to the pliable removable/portable bag.

8. The vehicle of claim 7 wherein the GFCI is affixed to the inside of the pliable removable/portable bag when attachable to the vehicle structure and the bag is foldable inside out such that the GFCI is affixed to the outside of the removable/portable bag.

9. The vehicle of claim 6 wherein the pliable removable/portable bag includes a handle portion for carrying the pliable removable/portable bag when the removable trim panel is removed from the vehicle trim structure.

10. The vehicle of claim 6 wherein the removable trim panel includes a locating mechanism that cooperates with an area of the vehicle trim structure surrounding the removable trim panel when the removable trim panel is attached to the vehicle trim structure, the locating mechanism locating and securing the removable trim panel with respect to the vehicle trim structure.

11. The vehicle of claim 10 wherein the locating mechanism comprises edges on the removable trim panel slidably receivable by slots defined by the vehicle trim structure.

12. The vehicle of claim 1 wherein the charge cord for connecting to an electrical power supply has a household outlet connector and the charge kit further including a second charge cord having a vehicle connector.

13. A charger kit for a vehicle comprising:
a removable trim panel connectable to a door trim;
a bag capable of being folded inside out connected to the removable trim panel; and
a charger connected to the bag and disposable within the bag with the trim panel outside of the bag when carried and stored and disposable outside of the bag with the trim panel inside the bag when used for charging.

14. The charger kit of claim 13 wherein the charger is a charger for a high voltage traction battery.

15. The charger kit of claim 13 wherein the charger includes an alternating current to direct current converter connected to the bag and disposed between a first side and a second side of a charge cord, wherein the first side of the charge cord has a household outlet connector and the second side of the charge cord has a vehicle connector, and the converter and charge cord are disposable outside of the bag when folded inside out and storable inside the bag by folding the bag around the charge cord to dispose the converter and charge cord within the bag.

16. The charger kit of claim 13 wherein the removable trim panel is a rigid structure defining edges, the door trim is a rigid structure defining slots, and the edges of the removable trim panel are slideably engagable with the slots of the door trim for storage of the bag and charger within a vehicle door behind the door trim.

* * * * *